United States Patent
Fujii et al.

(10) Patent No.: US 9,132,772 B2
(45) Date of Patent: Sep. 15, 2015

(54) SEAT PASSENGER DETERMINATION APPARATUS

(71) Applicant: Aisin Seiki Kabushiki Kaisha, Kariya-shi (JP)

(72) Inventors: Hiroyuki Fujii, Kariya (JP); Takahiro Izuno, Kariya (JP); Isao Honda, Anjo (JP); Yoshiaki Tomatsu, Kariya (JP); Yusuke Takahashi, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 167 days.

(21) Appl. No.: 13/798,529

(22) Filed: Mar. 13, 2013

(65) Prior Publication Data

US 2014/0277826 A1    Sep. 18, 2014

(51) Int. Cl.
*B60Q 3/02* (2006.01)
*B60N 2/00* (2006.01)
*B60R 21/015* (2006.01)

(52) U.S. Cl.
CPC .............. *B60Q 3/0293* (2013.01); *B60N 2/002* (2013.01); *B60R 21/015* (2013.01); *B60R 21/0152* (2014.10); *B60R 21/01516* (2014.10); *B60R 21/01544* (2014.10)

(58) Field of Classification Search
CPC ...... B60Q 3/0293; B60R 21/32; G01G 19/52; G01V 9/00
See application file for complete search history.

(56) References Cited

U.S. PATENT DOCUMENTS

| | | | | |
|---|---|---|---|---|
| 5,627,767 | A * | 5/1997 | Gabiniewicz et al. | 702/41 |
| 6,725,165 | B1 * | 4/2004 | Knox et al. | 702/42 |
| 6,997,474 | B2 * | 2/2006 | Midorikawa et al. | 280/735 |
| 7,011,338 | B2 * | 3/2006 | Midorikawa et al. | 280/735 |
| 8,011,715 | B2 * | 9/2011 | Endo et al. | 296/65.13 |
| 2006/0175096 | A1 * | 8/2006 | Hibner et al. | 177/144 |
| 2009/0288888 | A1 * | 11/2009 | Endo et al. | 177/144 |

FOREIGN PATENT DOCUMENTS

| JP | 9-207638 | 8/1997 |
|---|---|---|
| JP | 2001-21411 | 1/2001 |

OTHER PUBLICATIONS

Machine translation of JP Pub. No. 09-207638 A (http://www4.ipdl.inpit.go.jp/Tokujitu/tjsogodbenk.ipdl)(dated Oct. 7, 2014).*

* cited by examiner

*Primary Examiner* — John R Olszewski
*Assistant Examiner* — Jean-Paul Cass
(74) *Attorney, Agent, or Firm* — Oblon, McClelland, Maier & Neustadt, L.L.P.

(57) ABSTRACT

A seat passenger determination apparatus includes: a door closing timing detector configured to detect door closing timing after having gotten out of the vehicle directly or indirectly; a counter unit configured to start counting when the load detected by the load detector falls within a threshold value and reset the count when the load is deviated from the threshold value; a determination processing unit configured to determine that no passenger is seated on the vehicle seat because the passenger has gotten out, and transfer the mode to the not-seated recognition mode when the state in which the load within the predetermined threshold value continues for a predetermined time is detected by the counter unit; and a count restricting unit configured to stop the counting process performed by the counter unit temporarily when the door-closed state is detected by the door closing timing detector during the determination by the determination processing unit.

10 Claims, 7 Drawing Sheets

SEAT PASSENGER DETERMINATION APPARATUS

TECHNICAL FIELD

This disclosure relates to a seat passenger determination apparatus.

BACKGROUND ART

A vehicle seat of an automotive vehicle is configured to deploy an airbag in case of accident when a passenger is seated on the seat and hence a load detection unit configured to detect the load of the passenger is provided. The vehicle seat is also configured to determine to be "seated" indicating that the passenger is seated when the load detected by the load detection unit exceeds a predetermined threshold, and determine to be "not seated" when the load is not higher than the threshold value.

An example of a passenger sensing unit configured to determine the presence or absence of the passenger by sensing a load acting on the seat is described in JP 09-207638 A (hereinafter, referred to as Reference 1). In the passenger sensing unit disclosed in Reference 1, load sensors are installed only at two front and rear positions from among four seat mounting portions, whereby the presence or absence of the passenger is determined from the sum of the obtained two load values.

According to the passenger sensing unit described above, by mounting the load sensors at two positions at the front and the rear on the left or right side of the seat mounting portion, the presence or absence of the passenger may be determined while minimizing the number of positions of installation of the load sensors, and achieving cost reduction and weight reduction of the unit.

However, in a method of installing the load sensors at two positions on the front and the rear on the left or right side of the seat mounting portion, the load value to be detected by the load sensor in association with a turning of the vehicle varies, and there is a risk that erroneous determination is made. For example, when the load sensors are installed at two front and rear positions inside on a passenger seat side of a vehicle having a steering wheel on the left side, the load value detected by the load sensor is reduced by a centrifugal force that acts on the seat in association with the leftward turning travel of the vehicle. Therefore, distinction of whether the load value detected by the load detection unit is caused by unloading of the passenger or by the turning of the vehicle becomes difficult, and depending on the behavior of the vehicle, an airbag display lamp is continuously lit even though the passenger has gotten out of the vehicle.

Therefore, a seat passenger determination apparatus configured so as not to be associated with drawbacks as described above is desired.

SUMMARY

A seat passenger determination apparatus disclosed here includes: a seatbelt fastening detector configured to detect whether the seatbelt is in a fastened state or in a non-fastened state; a load detector arranged on a lower side of the vehicle seat and configured to detect a load acting on the vehicle seat; a door closing timing detector configured to detect door closing timing after the passenger has gotten out of the vehicle directly or indirectly; a counter unit configured to start counting when the load detected by the load detector falls within a threshold value, and reset the count when the load is deviated from the threshold value in the passenger-seated recognition mode; a determination processing unit configured to determine that no passenger is seated on the vehicle seat because the passenger has gotten out, and transfer the mode to the not-seated recognition mode when the state in which the load within the predetermined threshold value continues for a predetermined time is detected by the counter unit; and a count restricting unit configured to stop the counting process performed by the counter unit temporarily when the door closing timing is detected by the door closing timing detector during the determination by the determination processing unit.

DETAILED DESCRIPTION

Figure 1:
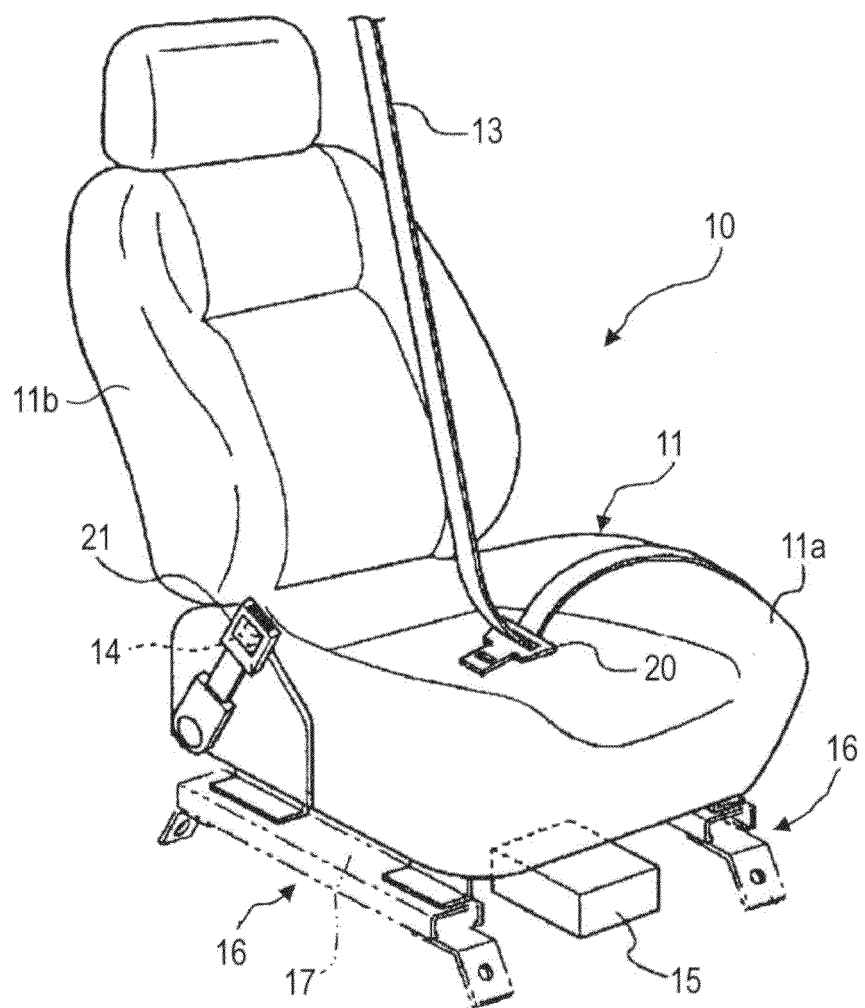
FIG. 1 is a perspective view of a vehicle seat provided with a seat passenger determination apparatus illustrating a first embodiment of the invention.

Referring now to the drawings, an embodiment disclosed here will be described below. The directions such as "fore-and-aft, left and right, up and down" used in this specification are described with reference to the respective directions of the vehicle viewed from a passenger seated on a vehicle seat 11. In this embodiment, it is assumed that the vehicle has a steering wheel on the left side, and that the presence or absence of the passenger seated on a passenger seat is determined.

As illustrated in FIG. 1, the vehicle seat 11 on the passenger seat side includes a seat cushion 11a as a seat surface where the passenger is to be seated, and a seatback 11b as a backrest mounted so as to be rotatable in the fore-and-aft direction at a rear end portion of the seat cushion 11a. The vehicle seat 11 includes a load detection unit 12 (see FIG. 2 and FIG. 3) as a load detector configured to detect the load of the passenger seated on the seat cushion 11a or of an article, a seatbelt 13 configured to constrain the passenger seated on the vehicle seat 11 when fastened and release the same when not fastened, a buckle switch 14 configured to detect whether the seatbelt 13 is in the fastened state or not in the fastened state, and a controller 15.

Figure 2:
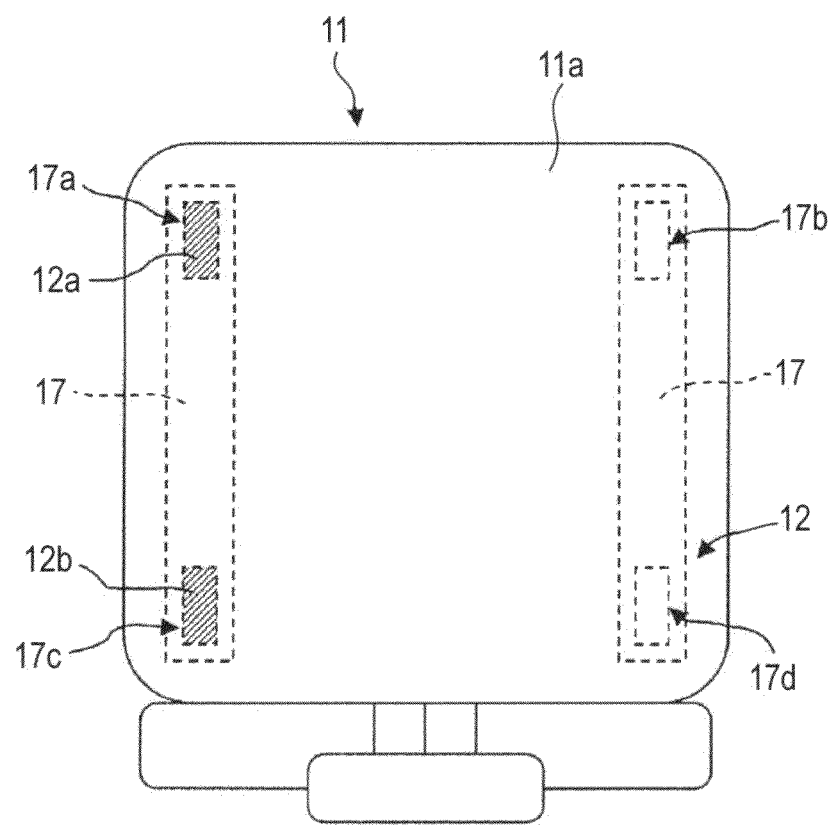
FIG. 2 is a drawing of the vehicle seat viewed from the top thereof.

The vehicle seat 11 is supported by a vehicle floor via a pair of left and right upper rails 17 of a seat sliding unit 16 which supports the vehicle seat 11 so as to be capable of adjusting the position thereof in the fore-and-aft direction of the vehicle. On the pair of left and right upper rails 17, as illustrated in FIG. 2, four supporting leg portions 17a, 17b, 17c, and 17d supporting the seat cushion 11a of the vehicle seat 11 are disposed at four corners apart from each other in the left and right direction and the fore-and-aft direction of the vehicle.

The load detection unit 12 includes two load sensors 12a and 12b, and the load sensors 12a and 12b are each formed of a strain gauge-type sensor having an amplifier integrated therein. The two load sensors 12a and 12b are interposed between the seat cushion 11a and the upper rails 17 at two positions at the front and rear on one side (inside) of the left and right of the four supporting leg portions 17a to 17d described above, so that the load of the passenger or the like seated on the seat cushion 11a of the vehicle seat 11 can be detected by the two load sensors 12a and 12b.

The seatbelt 13 is provided with a tongue plate 20 in the middle thereof as illustrated in FIG. 1, and a buckle 21 engageable with the tongue plate 20 is provided at a side portion of the seat cushion 11a. The buckle 21 includes the buckle switch 14 constituting a seatbelt fastening detector integrated therein, so that a ON signal indicating that the seatbelt 13 is in a fastened state is output from the buckle switch 14 when the tongue plate 20 is engaged with the buckle 21. When the tongue plate 20 is not engaged with the buckle 21, the buckle switch 14 outputs an OFF signal indicating that the seatbelt 13 is not in the fastened state.

Figure 3:
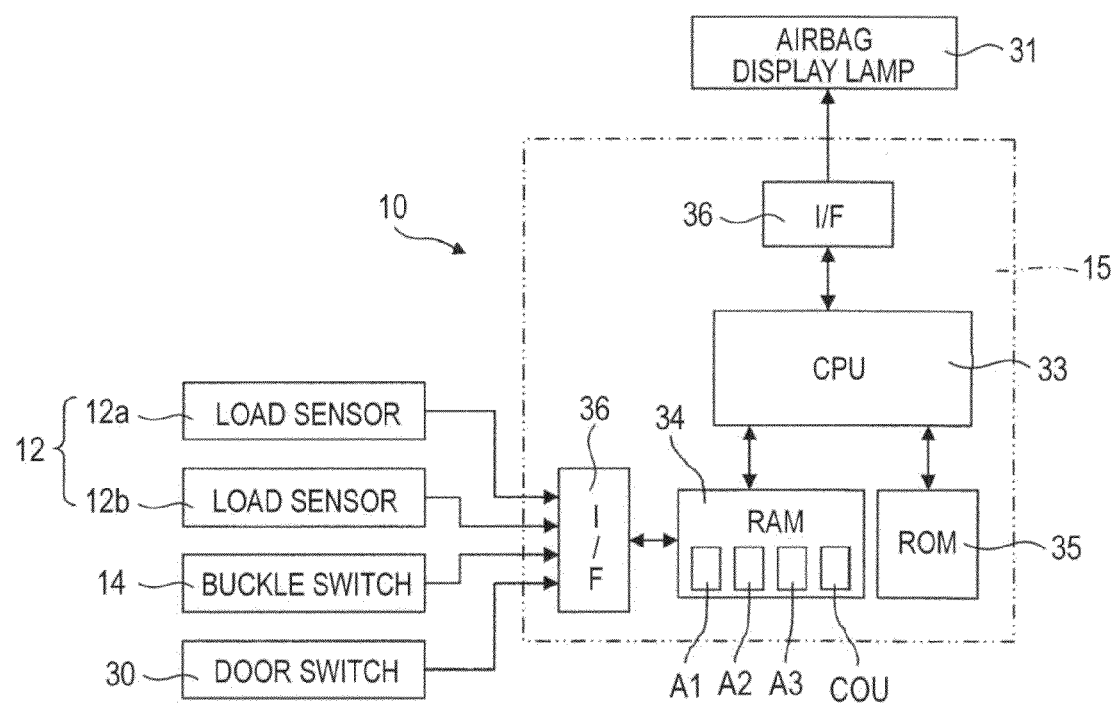
FIG. 3 is a block diagram of a seat passenger determination apparatus.

FIG. 3 is a block diagram of the seat passenger determination apparatus 10, and the controller (ECU) 15 as a control unit includes a CPU 33, a RAM 34, a ROM 35, and an interface 36, and a seat passenger determination program is stored in the ROM 35. The RAM 34 is configured to allow entry of the load signals detected by the two load sensors 12a and 12b and the ON/OFF signal from the buckle switch 14 of the seatbelt 13 and an ON/OFF signal of a door opening-and-closing sensing switch 30 configured to sense the opening and closing of the door on the passenger seat side via the interface 36. An airbag display lamp 31 indicating that an airbag, not illustrated, is in the operable state is connected to the CPU 33 via the interface 36.

The CPU 33 detects the weight of the passenger seated on the vehicle seat 11 and the weight of the article placed on the vehicle seat 11 by adding the load signals from the two load sensors 12a and 12b transmitted to the RAM 34. For example, when the passenger or the like is seated on the vehicle seat 11 in a normal posture, substantially equivalent loads are applied to the two load sensors 12a and 12b disposed at the front and rear on one of the left and right of the seat cushion 11a.

Accordingly, the weight of the passenger seated on the vehicle seat 11 and the weight of the article may be detected by adding the respective load signals detected by the two load sensors 12a and 12b by the CPU 33. The outputs from the load sensors 12a and 12b are calibrated to zero point in a state in which the vehicle is situated on a flat ground and in a vacant state in which nobody is seated or nothing is placed on the seat cushion 11a.

The RAM 34 is provided with a memory area A1 in which a "not-seated recognition mode" M1 which recognizes a no-seated state in which the passenger is not seated on the vehicle seat 11 is stored, a memory area A2 in which a "passenger-seated recognition mode" M2 which recognizes a state in which the passenger is seated is stored, and a memory area A3 in which an "article recognition mode" M3 which recognizes a state in which the article is placed is stored. When the "article recognition mode" M3 and the "not-seated recognition mode" M1 are memorized, the airbag display lamp 31 is turned OFF, while the "passenger-seated recognition mode" M2 is memorized, the airbag display lamp 31 is turned ON.

Figure 4:
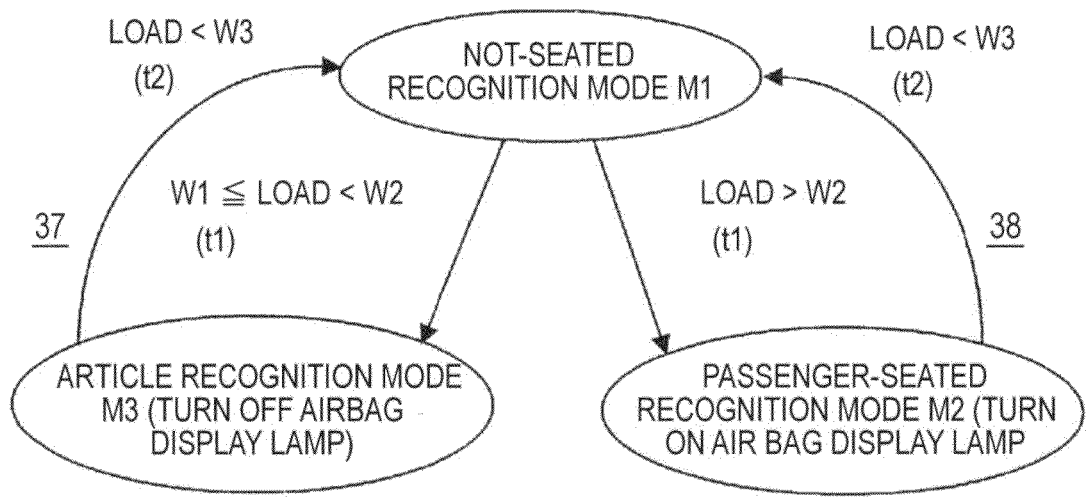
FIG. 4 is a drawing illustrating a transition state of the seat passenger determination apparatus.

The controller 15 is configured to perform a first transition process 37 and a second transition process 38 as illustrated in FIG. 4. The first transition process 37 is configured to transfer the mode to the "article recognition mode" M3 on the condition that the load detection unit 12 detects a load larger than a first load W1 and smaller than a second load W2 continuously for a preset time t1 in the "not-seated recognition mode" M1, and to the "not-seated recognition mode" M1 on the condition that the load detection unit 12 detects a load smaller than a third load W3 slightly smaller than the first load W1 continuously for a preset time t2 in the "article recognition mode" M3.

The second transition process 38 is configured to transfer the mode to the "passenger-seated recognition mode" M2 on the condition that the load detection unit 12 detects the load larger than the second load W2 continuously for a preset time t1 in the "not-seated recognition mode" M1, and to the "not-seated recognition mode" M1 on the condition that the load detection unit 12 detects the load smaller than a third load W3 continuously for a preset time t2 in the "passenger-seated recognition mode" M2.

In this embodiment, the grounds that the reference of determination of the "passenger-seated recognition mode" M2 is determined to be a case where the load not lower than the second load W2 is detected by the load detection unit 12 are that the load detection unit 12 is configured to be capable of sensing the fact that the passenger is seated even when a child from 6 years of old required to fasten the seatbelt 13 or a relatively undersized adult woman are seated on the front portion of the seat cushion 11a.

Incidentally, in the embodiment disclosed here, since the load sensors 12a and 12b which constitute the load detection unit 12 are arranged only on the front and rear on one side (inner side) of the vehicle seat 11, the load value detected by the load detection unit 12 varies depending not only on whether the passenger is seated on the vehicle seat 11 or has moved apart from the vehicle seat 11 for getting out as a matter of course, but also on whether the vehicle turns leftward or rightward.

In other words, when the vehicle travels so as to turn leftward, the vehicle seat 11 on the passenger side (the right side of the vehicle) and the passenger seated thereon are leaned rightward by a centrifugal force, so that an output from the load detection unit 12 becomes smaller. In contrast, when the vehicle travels so as to turn rightward, an output from the load detection unit 12 becomes larger.

In this case, if the passenger seated on the vehicle seat 11 fastens the seatbelt 13, the "passenger-seated recognition mode" M2 may be fixed irrespective of the reduction of the load detected by the load detection unit 12 and transition to the "not-seated recognition mode" M1 does not occur. However, in the non-fastened state of the seatbelt 13, the mode cannot be determined to be the "not-seated recognition mode" M1 even though the output of the load detection unit 12 is reduced to a value smaller than the threshold value, and whether the reduction of the load is caused by the leftward turning travel or by unloading of the passenger needs to be determined.

Whether the reduction of the load is caused by the turning travel or by the fact that the passenger has gotten out may be determined by reviewing a variation range of the load. For example, during the leftward turning travel, the output from the load detection unit 12 is reduced significantly. However, the output from the load detection unit 12 is not stabilized. It is because maintenance of the steering angle or vehicle speed constantly is difficult and, in addition, the load is varied due to the irregularity of the road surface.

In contrast, when the passenger seated on the passenger seat has gotten out of the vehicle, since the vehicle is stopped as a matter of course, not only the output from the load detection unit 12 is significantly reduced, but also the output from the load detection unit 12 is stabilized.

According to an experiment conducted by the inventors, it is understood that whether the passenger has gotten out or the vehicle has turned is distinguished by setting a threshold value α of a load variation range (for example, on the order of ±0.2 kg) and checking whether the output from the load detection unit 12 falls within the load variation range α or not. In other words, when the variation range of the load within a continues for a predetermined time, it is determined that the passenger has gotten out, and when the variation range of the load is out of the variation range α, it may be determined to be the vehicle turning. A load variation caused by the influence of an electric noise or the load variation caused by the influence of idling vibration occurs even while the vehicle is stopped, the load variation range is set so as to allow these variations.

When the door opening-and-closing sensing switch 30 (see FIG. 3) is changed from OFF to ON in a state in which the passenger does not fasten the seatbelt 13, that is, when the door is opened once and then closed, the passenger has a high likelihood of getting out the vehicle during a predetermined period after the door is closed. In this case, it is estimated that the variation range of the output from the load detection unit 12 significantly increased due to the vibration of the vehicle seat 11 caused by closing of the door.

Therefore, during a predetermined time after the door has closed, deviation of the load from a predetermined variation range (a stable area) a, even though it happens, may be ignored as a cause of disturbance, so that the fact that the passenger has gotten out may be determined with precision.

Figure 5:
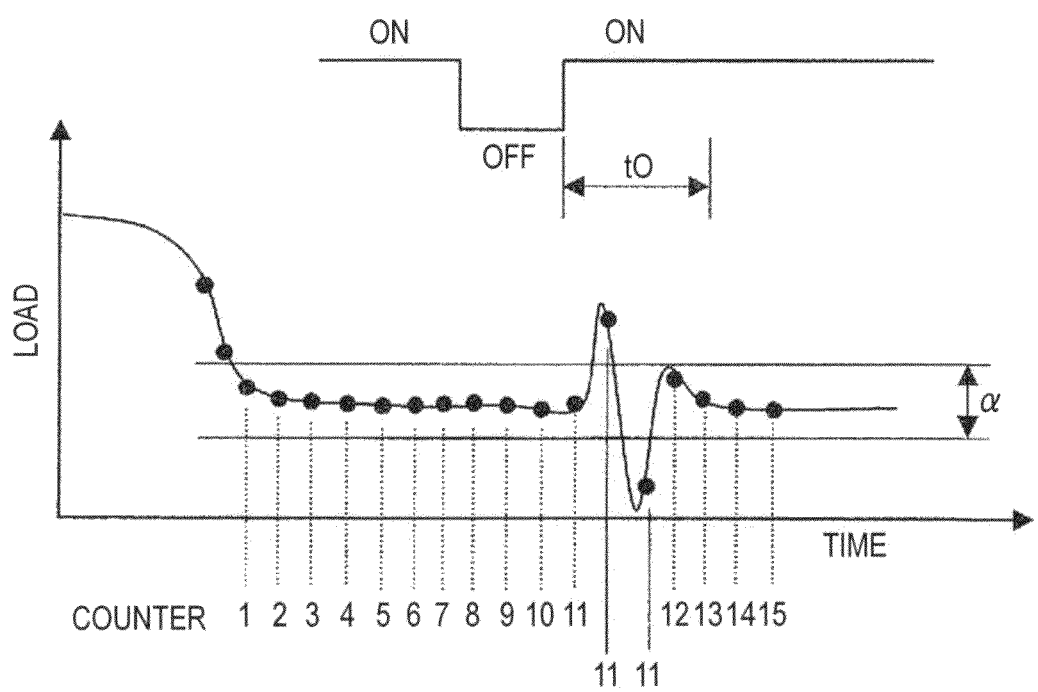
FIG. 5 is a graph illustrating an experimental data of a load variation.
Figure 6:
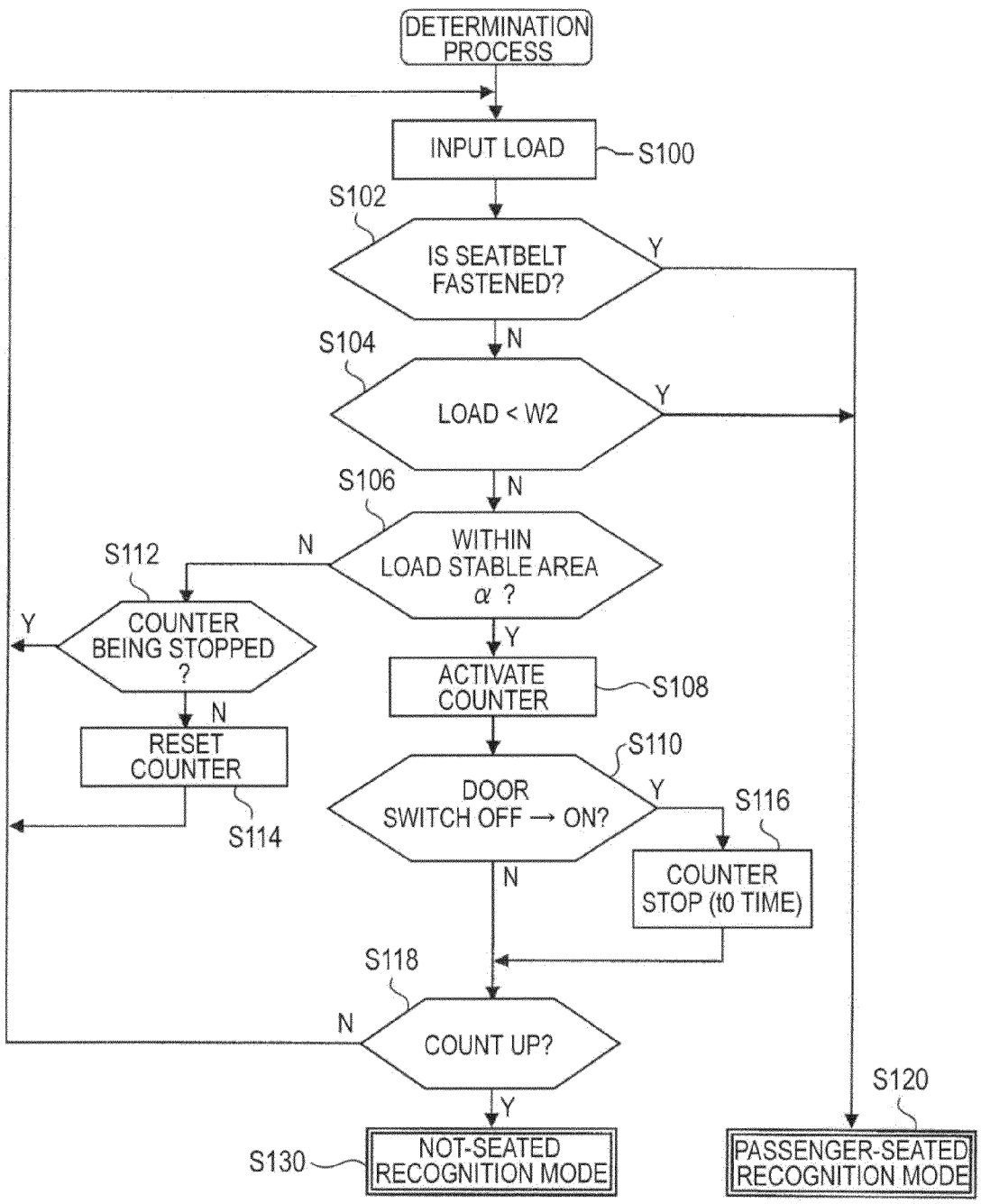
FIG. 6 is a drawing illustrating a flowchart of the seat passenger determination apparatus.

FIG. 5 and FIG. 6 show a graph and a flowchart used in the determination process for determining the fact that the passenger has gotten out with a signal variation of the door opening-and-closing sensing switch 30 as a trigger. In this determination process, whether the reduction (variation) of the load due to the turning travel or the reduction (variation) of the load brought about because the passenger has gotten out of the vehicle is distinguished basically by whether or not the load value detected by the load detection unit 12 is stable.

FIG. 5 illustrates an example of the load variation when the passenger has gotten out of the vehicle. In other words, when a state in which the load value detected by the load detection unit 12 is reduced and maintained in the a predetermined stable area α is continued for a given time (TN) in a state in which the mode is determined to be the "passenger-seated recognition mode" M2, it is determined that the reduction of the load is likely to be brought about the fact that the passenger has gotten out of the vehicle. However, when the load value varies beyond the predetermined stable area α, during the given time (TN), it is determined that the reduction of the load is likely to be caused by the turning of the vehicle.

In the embodiment, the time (TN) may be measured by a counter COU (see FIG. 3) provided in the RAM 34. In other words, the load values detected by the load detection unit 12 are sampled at every unit time (for example, 100 ms) as illustrated in FIG. 5, and if the sampled load value is within the stable area α, the value of the counter COU is incremented by "1", and the time (TN) is measured by the count-up of the counter COU (the stable area α is continued for a predetermined time).

When whether or not the sampled load value is within the stable area α is determined, it is preferable to determine from a difference obtained by comparing the detected load sampled immediately before (the latest detected load) and a newest sampling load sampled subsequently, or from a difference between an average load of a plurality of detected loads sampled immediately before, that is, an average load of the plurality of detected loads sampled at the previous time, before the previous time, and so force until N times before the previous time and the latest detected load. Accordingly, it is determined that the sampled load value is within the stable area α accurately irrespective of the load variation due to the noise or the like.

Incidentally, immediately after the door is closed, there is a possibility that the load variation associated with the vibrations of the vehicle seat 11 caused by closing of the door occurs. Therefore, in the embodiment disclosed here, counting by the counter COU is stopped temporarily for a given time t0 after the closing of the door by utilizing a change of the signal of the door opening-and-closing sensing switch 30 and the variation of the load immediately after the closing of the door is ignored.

Accordingly, when the stable area α of the load is continued for a predetermined time TN (the count value counted by the counter COU is N1), it is determined that the passenger has gotten out of the vehicle. When the load is deviated from the stable area α, it is normally determined to be affected by the turning of the vehicle and the counter COU is reset to zero. However, during a given time t0 after the closing of the door, only the counting with the counter COU is temporarily stopped even though the load is deviated from the stable area α, and the load variation during this period is ignored, and the content of the counter COU is maintained as illustrated in FIG. 5. Then, after the elapse of the given time t0, the counting action by the counter COU is restarted, and when the counter COU is counted up, it is determined that the passenger has gotten out of the vehicle.

Consequently, whether the variation of the load exceeding the stable area α is caused by the cause of disturbance associated with the closing of the door or caused by the turning travel can be distinguished, so that the fact that the passenger has gotten out of the vehicle may be determined with high degree of accuracy. As a result, the airbag display lamp 31 is continuously lit though the passenger has gotten out of the vehicle, doubt of the driver about a breakdown of the apparatus may be swept away.

FIG. 6 illustrates a flowchart of a determination process processed by the controller 15, and this flowchart is repeatedly executed every predetermined time.

First of all, the load value detected by the load detection unit 12 is input in Step S100, and whether or not the seatbelt 13 is in the fastened state is determined in a subsequent Step S102. When the result of determination in Step S102 is Y (YES), that is, when the seatbelt 13 is in the fastened state, the procedure goes to Step S120, where it is determined that the passenger is seated on the vehicle seat 11 and hence the mode is determined to be the "passenger-seated recognition mode" M2, which is memorized in the RAM 34 of the controller 15. Accordingly, the airbag display lamp 31 is turned ON.

When the result of determination in Step S102 is N (No), that is, when the seatbelt 13 is in the non-fastened state, the procedure goes to Step S104, where whether or not the load value detected by the load detection unit 12 is not lower than the second load W2 is determined. When the result of determination in Step S104 is Y, the procedure goes to Step S120 described above, where the mode is determined to be the "passenger-seated recognition mode" M2.

When the load value detected by the load detection unit 12 is lower than the second load W2, the procedure goes to Step S106, where whether or not the load is within the preset threshold value (the stable area) α is determined, and when the result of determination is Y, the counter COU is activated in Step S108. The counter COU is configured to increment the value by every unit time as described above. Subsequently, whether or not the door opening-and-closing sensing switch 30 on the passenger seat side is changed from OFF to ON, that is, whether the door is opened or closed, is determined in Step S110.

In contrast, when it is determined that the load is deviated from the stable area α in Step S106, the procedure goes to Step S114 via Step S112, described later, where the counter COU is reset.

When the result of determination of Step S110 described above is Y, the operation of the counter COU is stopped for the given time t0 in Step S116, and then the procedure goes to Step S118. In Step S118, whether or not the counter COU is counted up is determined. When the counter COU is counted up (the stable area α is continued for the given time (TN)) in Step S118, the procedure goes to Step S130, where it is determined that the passenger is not seated on the vehicle seat 11 and hence the mode is determined to be the "not-seated recognition mode" M1, which is memorized in the RAM 34 of the controller 15. Accordingly, the airbag display lamp 31 is turned OFF.

When the counter COU is stopped for the given time t0 in Step S116, the result of determination in Step S112 is Y. Therefore, even when the load is determined to be deviated from the stable area α in Step S106, the procedures returns from Step S112 to Step S100, and the counter COU is not reset.

Step S116 described above constitutes the count restricting unit configured to stop the counting process by the counter COU temporarily. Step S118 described above constitutes a determination processing unit configured to transfer the mode to the "not-seated recognition mode" M1 when the fact that the load within the predetermined threshold value α continues for the given time (TN) is detected by the counter COU.

When the door opening-and-closing sensing switch 30 is changed from OFF to ON, since the passenger has a high likelihood of getting out of the vehicle, even when the load is deviated from the load stable area α, the counter COU is not reset and the operation of the counter COU is continued, so that the fact that the passenger has gotten out of the vehicle can be determined with precision.

Figure 7:
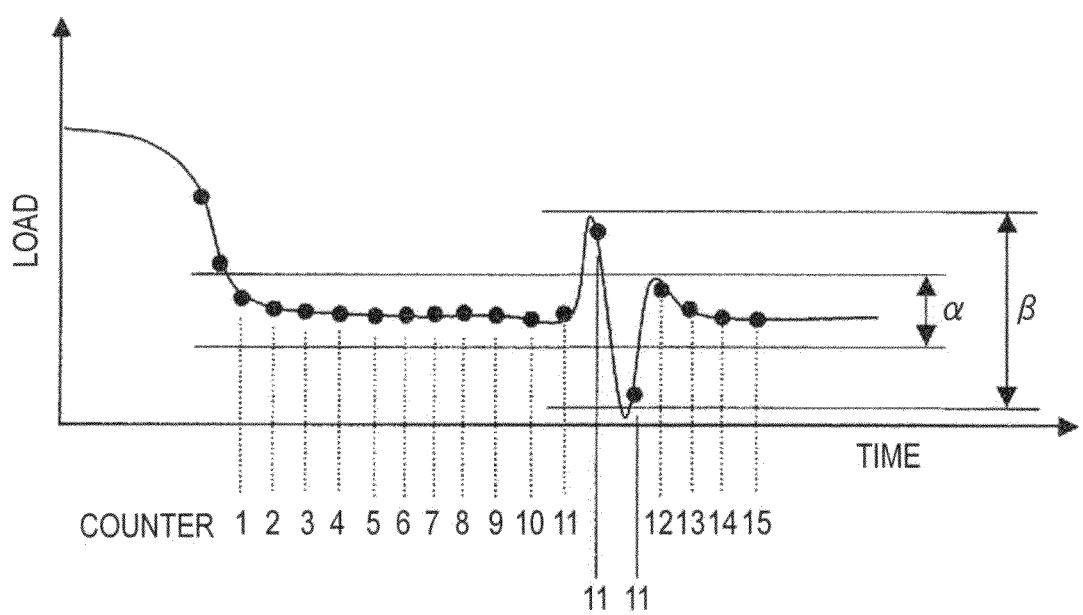
FIG. 7 is a drawing illustrating a second embodiment of the invention.

FIG. 7 illustrates a second embodiment disclosed here. The second embodiment is configured to be capable of ignoring a specific load variation without using the door opening-and-closing sensing switch 30 although the load variation is ignored for the given time t0 after the door has closed by using the door opening-and-closing sensing switch 30 in the first embodiment.

In other words, a point, that the counter COU starts counting when the load value detected by the load detection unit 12 is reduced to fall within a predetermined range and enters the stable area α in a state in which the mode is determined to be the "passenger-seated recognition mode" M2, and it is determined that the passenger has gotten out the vehicle when the stable area α is continued for the predetermined time, is common to the first embodiment.

When the load variation is deviated from the stable area α and brought into an unstable state during the predetermined time after the start of the counting by the counter COU, whether the unstable state is caused by the turning travel or the vibration of the vehicle seat 11 caused by closing the door or contacting of the passenger with the vehicle seat 11 when the passenger gets out of the vehicle may be distinguished by analyzing the unstable state.

For example, when a duration of deviation from the stable area α and the value deviated from the stable area α ⊓ exceeds a predetermined range (a second threshold value) β which is larger than the stable area α as illustrated in FIG. 7, it is determined that the load reduction is caused by the turning travel, and when they fall within the predetermined range β, it is determined that the load reduction is brought about because the passenger has gotten out of the vehicle.

Therefore, assuming that the counter COU increments the value by "1" when the load value detected by the load detection unit 12 is sampled at every unit time and the sampled load value falls within the load stable area in the same manner as described in the first embodiment, when the load value is deviated from the stable area α continuously by a predetermined number of times or varies beyond the predetermined range β, it is determined that the variation is caused by the turning travel, and the counter COU is reset. In contrast, the number of times when the load value is deviated continuously from the stable area α is smaller than a predetermined number of times and the amount of the variation of the load is within the predetermined range β, it is determined to be the variation brought about because the passenger has gotten out of the vehicle, and the counter COU is temporarily stopped. When the counter COU is counted up, determination that the passenger has gotten out of the vehicle is settled.

According to the second embodiment disclosed here, the fact that the passenger has gotten out the vehicle is determined with high degree of accuracy even without using the door opening-and-closing sensing switch 30, and such an event that the airbag display lamp 31 is prevented from continuously lit even though the passenger has gotten out of the vehicle is avoided in the same manner as the first embodiment.

The door closing timing sensing unit in Claims include both a configuration in which the timing when the vibration of the vehicle seat 11 caused by the closing of the door is sensed by using the door opening-and-closing sensing switch 30 as described in the first embodiment and a configuration in which the timing when the vibration of the vehicle seat 11 caused by the passenger at the time when the passenger gets out of the vehicle after having opened the door is sensed as described in the second embodiment.

According to the embodiment described above, when the door closing timing is detected by the door closing timing detector composed of a door opening-and-closing sensing switch 30 or the like, the fact that the passenger has gotten out of the vehicle after the door has closed can be determined accurately since the count restricting unit configured to stop the counting process by the counter COU temporarily (Step S116) is provided, so that the transfer from the "passenger-seated recognition mode" M2 to the "not-seated recognition mode" M1 may be performed with high degree of accuracy.

In other words, since it is highly likely that the passenger has gotten out of the vehicle within a given time when the door is closed, the fact that the passenger has gotten out of the vehicle may be determined in an early stage by ignoring the increase in variation range of the load for the determination of the fact that the passenger has gotten out even if it occurs, so that such an event that the airbag display lamp 31 is continuously lit even though the passenger has gotten out of the vehicle is avoided.

According to the embodiment disclosed here, the load detector includes two load sensors arranged respectively at the front and rear on one of the left and right side of the vehicle seat, and is configured to detect the load acting on the vehicle seat on the basis of the sum of the loads detected by these load sensors. Therefore, the load acting on the vehicle seat can be detected accurately by the two load sensors irrespective of the turning or the like of the vehicle.

According to the embodiment described above, since the counter COU determines whether or not the difference between the latest detected load and the previous detected load or the difference between the latest detected load and the average load of a plurality of the previous detected load values falls within the threshold value α, the fact that the sampled load value falls within the threshold value α is accurately determined, irrespective of the load variation due to the influence of noise or the like.

In the embodiment described above, the example in which the two load sensors 12*a* and 12*b* are arranged on the front and rear inside (left side) of the passenger seat of the vehicle having the steering wheel on the left side has been described. However, the invention does not limit the positions where the load sensor is arranged or the number of the load sensors. For example, an arrangement in which only one load sensor is arranged, an arrangement in which the two load sensors are arranged on the left and right sides of the rear portion of the vehicle seat 11, or an arrangement in which the load sensors are arranged at three positions on the front, rear, left and right are also applicable.

The counter COU is not limited to a configuration in which the load values detected by the load detection unit 12 are sampled at every unit time and counted as in the embodiment disclosed herein, and any configurations may be employed as long as the time is measured.

Although the invention has been described with reference to the embodiment, the invention is not limited to the configuration described in the embodiment and various modes may be employed within a range described in Claims.

The invention claimed is:

1. A seat passenger determination apparatus configured to determine whether the mode is a passenger-seated recognition mode in which the passenger is seated on a vehicle seat or a not-seated recognition mode in which no passenger is seated on the vehicle seat, comprising:
    a seatbelt fastening detector configured to detect whether a seatbelt is in a fastened state or in a non-fastened state;
    a load detector arranged on a lower side of the vehicle seat and configured to detect a load acting on the vehicle seat;
    a door closing timing detector configured to detect door closing timing after the passenger has gotten out of the vehicle directly or indirectly;
    a counter unit configured to start a counting process when the load detected by the load detector falls within a threshold value and reset the count when the load is deviated from the threshold value in the passenger-seated recognition mode;
    a determination processing unit configured to determine that no passenger is seated on the vehicle seat because the passenger has gotten out, and transfer the mode to the not-seated recognition mode when the state in which the load within the predetermined threshold value continues for a predetermined time is detected by the counter unit; and
    a count restricting unit configured to stop the counting process performed by the counter unit for a predetermined time when the door closing timing is detected by the door closing timing detector during the determination by the determination processing unit,
    wherein when the predetermined time is elapsed the counter unit restarts the counting process.

2. The seat passenger determination apparatus according to claim 1, wherein the door closing timing detector is composed of a door opening-and-closing sensing switch configured to sense the opening and closing of the door, and is configured to detect a case where the door opening-and-closing sensing switch is changed from OFF to ON as a door closing timing after having gotten off the vehicle.

3. The seat passenger determination apparatus according to claim 1 wherein when the load value detected by the load detector exceeds the threshold value, the determination processing unit determines a case where the load value detected by the load detector does not exceed the threshold value continuously for a preset time or a case where the load value does not exceed a second threshold value set to be a larger value than the threshold value as a door closing timing after having gotten off the vehicle, and the count restricting unit stops a counter process by the counter portion from a time point exceeding the threshold value onward for a given time.

4. The seat passenger determination apparatus according to claim 1, wherein the load detection unit includes two load sensors arranged respectively at the front and rear on one of the left and right side of the vehicle seat, and is configured to detect a load acting on the vehicle seat on the basis of the sum of the loads detected by these load sensors.

5. The seat passenger determination apparatus according to claim 2, wherein the load detection unit includes two load sensors arranged respectively at the front and rear on one of the left and right side of the vehicle seat, and is configured to detect a load acting on the vehicle seat on the basis of the sum of the loads detected by these load sensors.

6. The seat passenger determination apparatus according to claim 3, wherein the load detection unit includes two load sensors arranged respectively at the front and rear on one of the left and right side of the vehicle seat, and is configured to detect a load acting on the vehicle seat on the basis of the sum of the loads detected by these load sensors.

7. The seat passenger determination apparatus according to claim 1, wherein the counter unit determines whether or not the difference between the latest detected load and the previous detected load or the difference between the latest detected load and the average load of a plurality of previous detected load values falls within the threshold value.

8. The seat passenger determination apparatus according to claim 2, wherein the counter unit determines whether or not the difference between the latest detected load and the previous detected load or the difference between the latest detected load and the average load of the plurality of previous detected load values falls within the threshold value.

9. The seat passenger determination apparatus according to claim 3, wherein the counter unit determines whether or not the difference between the latest detected load and the previous detected load or the difference between the latest detected load and the average load of the plurality of previous detected load values falls within the threshold value.

10. The seat passenger determination apparatus according to claim 4, wherein the counter unit determines whether or not the difference between the latest detected load and the previous detected load or the difference between the latest detected load and the average load of the plurality of previous detected load values falls within the threshold value.

* * * * *